United States Patent
Lincoln et al.

(10) Patent No.: US 10,677,714 B2
(45) Date of Patent: Jun. 9, 2020

(54) OPTICALLY ENHANCED PROTECTIVE COVER FOR CHAMBERLESS POINT SENSOR

(71) Applicant: Kidde Technologies, Inc., Wilson, NC (US)

(72) Inventors: David L. Lincoln, Cromwell, CT (US); Jennifer M. Alexander, Glastonbury, CT (US); Michael J. Birnkrant, Wethersfield, CT (US); Peter R. Harris, West Hartford, CT (US)

(73) Assignee: Kidde Technologies, Inc., Wilson, NC (US)

( * ) Notice: Subject to any disclaimer, the term of this patent is extended or adjusted under 35 U.S.C. 154(b) by 0 days.

(21) Appl. No.: 16/009,885

(22) Filed: Jun. 15, 2018

(65) Prior Publication Data
US 2019/0383729 A1 Dec. 19, 2019

(51) Int. Cl.
| | | |
|---|---|---|
| *G01N 21/15* | (2006.01) | |
| *G01N 21/53* | (2006.01) | |
| *G08B 17/107* | (2006.01) | |

(52) U.S. Cl.
CPC ............ *G01N 21/15* (2013.01); *G01N 21/53* (2013.01); *G01N 2201/022* (2013.01); *G08B 17/107* (2013.01)

(58) Field of Classification Search
CPC ..................................................... G01N 21/15
USPC ......................................................... 356/338
See application file for complete search history.

(56) References Cited

U.S. PATENT DOCUMENTS

| | | | | |
|---|---|---|---|---|
| 3,914,616 A | * | 10/1975 | Mooibroek | G08B 17/107 250/564 |
| 5,400,014 A | * | 3/1995 | Behlke | G08B 17/107 250/574 |
| 5,999,250 A | * | 12/1999 | Hairston | G01N 15/1434 250/461.2 |
| 6,064,430 A | * | 5/2000 | Lefkowitz | G08B 13/19619 348/151 |

(Continued)

FOREIGN PATENT DOCUMENTS

| | | |
|---|---|---|
| DE | 19912911 A1 | 10/2000 |
| GB | 2410085 A | 7/2005 |
| WO | 2009036988 A1 | 3/2009 |

OTHER PUBLICATIONS https://en.wikipedia.org/w/index.php?title=Optical_coating&oldid=84249080"3.
Extended European Search Report dated Nov. 12, 2019, received for corresponding European Application No. 19180405.3, 8 pages.

*Primary Examiner* — Tarifur R Chowdhury
*Assistant Examiner* — Omar H Nixon
(74) *Attorney, Agent, or Firm* — Kinney & Lange, P.A.

(57) ABSTRACT

A covered chamberless particulate detector includes a chamberless detector configured to produce a signal when particulate sensing events occur; one or more optical emitters disposed on the chamberless detector, configured to emit one or more emitting cones of light; one or more optical sensors disposed on the chamberless detector, defining one or more receiving cones; and a protective cover on the chamberless detector defining an inside region and an outside region. Each of the one or more optical sensors is configured to detect occurrence of particulate sensing events. The protective cover includes a material having one or more optical properties of transmission, reflection, and absorption; and at least of these optical properties has a bandwidth.

12 Claims, 7 Drawing Sheets

(56) References Cited

U.S. PATENT DOCUMENTS

| | | | |
|---|---|---|---|
| 7,940,190 B2 | 5/2011 | Penney | |
| 8,773,272 B2 | 7/2014 | Nagashima | |
| 8,952,821 B2 * | 2/2015 | Erdtmann | G01N 21/53 340/630 |
| 9,666,048 B2 | 5/2017 | Fischer et al. | |
| 9,835,549 B1 * | 12/2017 | Erdtmann | G01N 21/53 |
| 2001/0038338 A1 * | 11/2001 | Kadwell | G08B 17/107 340/630 |
| 2003/0046880 A1 * | 3/2003 | Brown | E04B 1/74 52/80.2 |
| 2006/0197033 A1 * | 9/2006 | Hairston | G01J 3/02 250/458.1 |
| 2007/0097366 A1 * | 5/2007 | LeBoeuf | G01N 21/532 356/338 |
| 2007/0170352 A1 * | 7/2007 | Fouquet | G01J 3/10 250/214 R |
| 2008/0018485 A1 * | 1/2008 | Kadwell | G08B 17/107 340/630 |
| 2011/0194111 A1 * | 8/2011 | Dohi | G08B 29/18 356/340 |
| 2013/0176131 A1 * | 7/2013 | Pichard | G01N 21/53 340/630 |
| 2013/0286392 A1 * | 10/2013 | Erdtmann | G01N 21/53 356/341 |
| 2014/0333928 A1 * | 11/2014 | Erdtmann | G08B 17/107 356/338 |
| 2015/0103346 A1 * | 4/2015 | Erdtmann | G08B 29/043 356/338 |
| 2015/0346086 A1 * | 12/2015 | Erdtmann | G08B 17/107 250/574 |
| 2015/0379845 A1 * | 12/2015 | Fischer | G01J 5/0066 250/338.3 |
| 2016/0343226 A1 * | 11/2016 | Fischer | G01K 1/024 |

\* cited by examiner

OPTICALLY ENHANCED PROTECTIVE COVER FOR CHAMBERLESS POINT SENSOR

CROSS-REFERENCE TO RELATED APPLICATION(S)

This application is related to U.S. application Ser. No. 15/936,073, entitled PROTECTIVE COVER FOR CHAMBERLESS POINT SENSOR, by inventors Lincoln, Birnkrant, Bell, Harris, and Alexander, filed on Mar. 26, 2018.

BACKGROUND

The present disclosure relates generally to particulate monitors and smoke detectors, and more particularly, to an optically enhanced protective cover for a chamberless sensor.

Smoke detectors play an important role in identifying smoke, ideally alarming as early as possible in the course of fire. Smoke detectors can use one or more sources of light as the source of the smoke detection scheme, and can use multiple wavelengths of light to help improve detection performance. For example, dual wavelengths of light, one being infrared and the other being visible, can be used in a smoke detector. A chamberless detector can provide improved sensing performance over designs that utilize a chamber, therefore resulting in the popularity of the chamberless design in high-performance applications. A chamberless detector can be referred to as a next-generation point sensor, because of its advanced design and its use in detecting smoke at a particular point of installation. A chamberless detector can also be referred to as a chamberless point sensor.

A commercial aircraft is a non-limiting example of a high-performance application where a chamberless point sensor utilizing multiple wavelengths of light can be used. There are many factors that contribute to the need for a high-performance chamberless detector, with non-limiting examples including the desire to discern between steam or dust and the smoke particles from a fire, the desire to avoid nuisance alarms from food preparation, and the desire to detect smoke particles that can be produced from smoldering synthetic materials, often resulting in particle sizes smaller than 0.5 µm (microns) in diameter. Additionally, chamberless detectors utilizing multiple wavelengths of light can be used to monitor indoor air quality, where the presence of fine particles (particle sizes ≤2.5 µm) and coarse particles (particle sizes ≤10 µm) can be important.

A protective cover can be positioned on a chamberless detector to overcome some of the problems that have been associated with chamberless detectors, for example, there not being a well-protected volume that is free from interference or tampering. Typical examples of a protective cover can include a clear or opaque cover, which can also include apertures. While a protective cover can be helpful in reducing interference from ambient light sources emanating from the surrounding environment, there can still be problems with the transmission, reflection, and/or absorption of light by a protective cover.

SUMMARY

A covered chamberless particulate detector includes a chamberless detector configured to produce a signal when particulate sensing events occur; one or more optical emitters disposed on the chamberless detector, configured to emit one or more emitting cones of light; one or more optical sensors disposed on the chamberless detector, defining one or more receiving cones; and a protective cover on the chamberless detector defining an inside region and an outside region. Each of the one or more optical sensors is configured to detect occurrence of particulate sensing events. The protective cover includes a material having one or more optical properties of transmission, reflection, and absorption, with at least one of these optical properties having a bandwidth.

A method of using a covered chamberless particulate detector that includes one or more optical emitters, one or more optical sensors, and an optically enhanced protective cover over the optical emitters and the optical sensors that defines an inside region and an outside region. The method includes: emitting one or more emitting cones of light from the one or more optical emitters; receiving light in one or more receiving cones by the one or more optical sensors; creating one or more sensing volumes within the spatial overlap between the one or more emitting cones and the one or more receiving cones; detecting particulate sensing events; and producing a signal denoting occurrence of the particulate sensing events based on presence of particulate material in one or more sensing volumes defined by an overlap of the one or more emitting cones of light and the one or more receiving cones. The optically enhanced protective cover defines one or more boundaries of the one or more sensing volumes, and each of the one or more optical sensors is configured to detect the occurrence of particulate sensing events. The protective cover includes a material having one or more optical properties of transmission, reflection, and absorption, with at least one of these optical properties having a bandwidth.

DETAILED DESCRIPTION

The present disclosure provides an optically enhanced protective cover for a chamberless point sensor. A chamberless point sensor can also be referred to as a next generation chamberless point sensor, a chamberless point sensor and monitor, a covered chamberless particulate detector, or a chamberless detector for short. As used in this disclosure, "particulate" will be used to describe all airborne particles that are detectable, which includes smoke. Moreover, the descriptions provided herein refer to the detection of airborne particulates by the interaction of light and the scattering of light to the optical detection circuitry of the chamberless detector.

During operation of a chamberless detector, one or more sources of light having one or more wavelengths illuminate one or more volumes in the vicinity of the chamberless detector. Airborne particulates in an illuminated volume can scatter light and/or fluoresce, which can be detected by the chamberless detector. The operation of a chamberless detector can be referred to as monitoring, whereby the chamberless detector monitors for sensing events. A sensing event is when an electrical response occurs within the detection circuitry as a result of a photo interaction. During the monitoring process, particulate levels can simply be displayed or recorded for later use by a user. Additional responses can also occur if various threshold criteria are met. Non-limiting examples of additional responses can include activating an alarm, triggering other system responses, and initiating protective actions.

Generally speaking, particulates, including smoke and other airborne particles, can vary in size depending on several factors including without limitation the materials that are smoldering, burning, or combusting, the temperature of the process, the stage of the process, and the concentration of oxygen and other gasses at the point of the process. The process can be combustion, pre-combustion, or any other process that produces airborne particulates. Moreover, processes other than combustion can cause airborne particulates. For example, chemical reactions can evolve airborne particulates. Particulates can generally range in size from 0.1-2.0 μm in diameter, however they can be smaller in size than 0.1 μm in diameter, or larger in size than 2.0 μm in diameter. Some particulates can be up to 10 μm in diameter. In some embodiments, covered point sensor 10 can monitor for indoor air quality, while being able to discriminate between fine particles (particle sizes ≤2.5 μm) and coarse particles (particle sizes ≤10 μm). Moreover, some particulates can be airborne biological agents. Airborne biological agents can also be referred to as "biologics". As used in this disclosure, "particulates" and "airborne particulates" refer to particulate matter from any source that exists in the void space in and around the covered point sensor, without limiting to a presence in air. For example, the covered point sensor of the present disclosure can detect particulates that exist in air, rarefied air, a vacuum, or within any other fluid whether liquid or gaseous.

Figure 1:
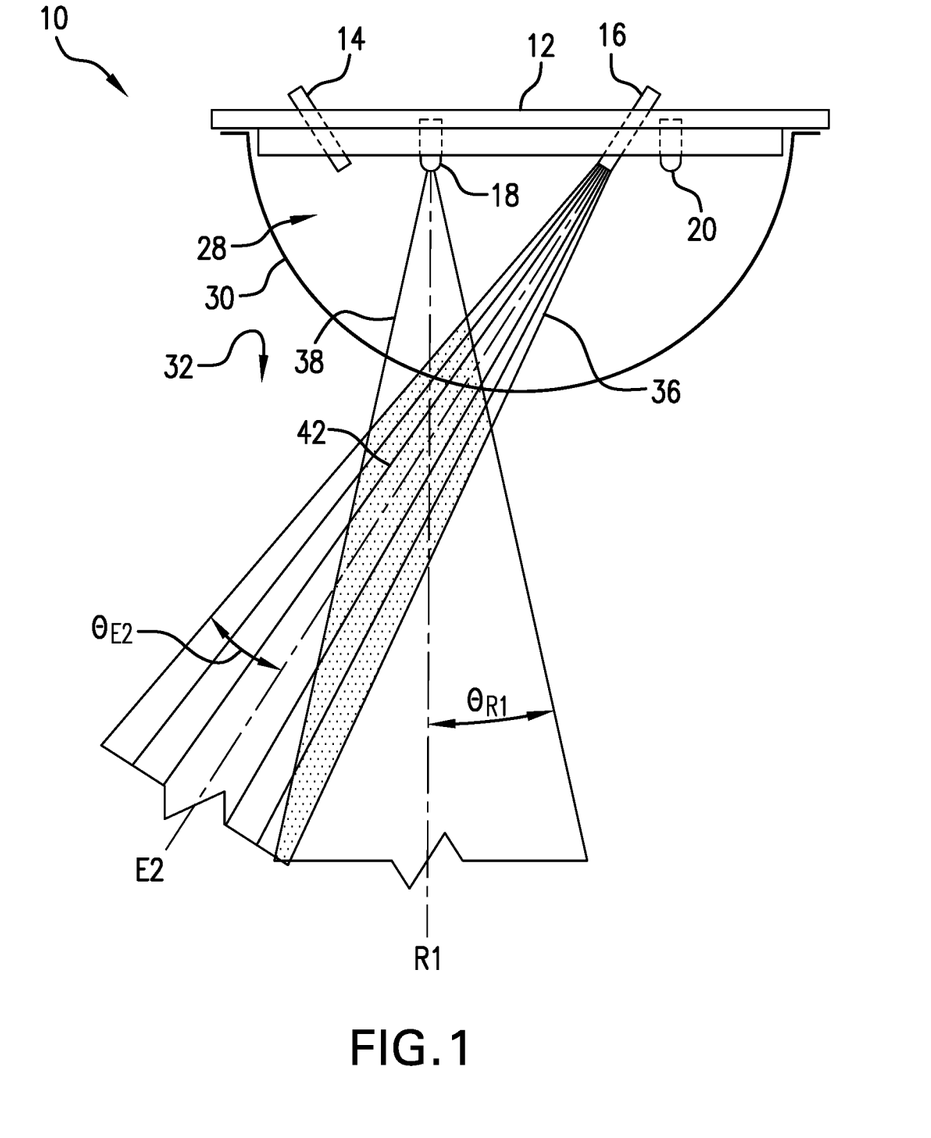
FIG. 1 is a side view of a first embodiment of a covered point sensor.

FIG. 1 is a side view of a chamberless particulate detector with a protective cover, or covered point sensor. Shown in FIG. 1 are covered point sensor 10, chamberless detector 12, first optical emitter 14, second optical emitter 16, first optical detector 18, second optical detector 20, inside region 28, protective cover 30, outside region 32, second emitting cone 36, second emitter axis E2, second emitter cone half angle $\theta_{E2}$, first receiving cone 38, first receiving cone axis R1, first receiving cone half angle $\theta_{R1}$, and first sensing volume 42.

As will be described later, first optical emitter 14 also has a first emitting cone (not shown), and second optical detector 20 also has an associated second receiving cone (not shown). Accordingly, multiple combinations involving first optical emitter 14, second optical emitter 16, first optical detector 18, and second optical detector 20 can be illustrated to depict the operation of covered point sensor 10. For clarity of illustration, FIGS. 1-4 each depict a single combination.

In the illustrated embodiment, covered point sensor 10 has a substantially hemispherical geometry, being comprised of chamberless detector 12 and protective cover 30. Chamberless detector 12 has a substantially flat profile as illustrated in the side view of FIG. 1. In the illustrated embodiment, chamberless detector 12 has a circular or disk-like shape viewed from the top or in perspective (not shown). In other embodiments, chamberless detector 12 can have other geometries.

In the illustrated embodiment, chamberless detector 12 includes first optical emitter 14 and second optical emitter 16. First optical emitter 14 and second optical emitter 16 produce and emit light having a wavelength or wavelengths that are employed by chamberless detector 12. In the illustrated embodiment, first optical emitter 14 and second optical emitter 16 each produce a peak wavelength of light. In an embodiment, first optical emitter 14 can produce an infrared light and second optical emitter 16 can produce a blue light. The infrared light can have a peak wavelength between 800-950 nm, but in some embodiments may be outside of this range. The blue light can have a peak wavelength between 400-500 nm, but in some embodiments may be outside of this range. In some embodiments, first optical emitter 14 and second optical emitter 16 can produce wavelengths of light in the infrared, visible, and ultraviolet bands of light. In these other embodiments, first optical emitter 14 and second optical emitter 16 can produce a wide range of wavelengths of light. For example, in an embodiment, first optical emitter 14 and/or second optical emitter 16 can produce violet or ultraviolet light having a wavelength shorter than 400 nm. In another embodiment, first optical emitter 14 and/or second optical emitter 16 can produce visible light having a wavelength between 380-700 nm. In yet other embodiments, first optical emitter 14 and/or second optical emitter 16 can produce infrared light having a wavelength greater than 700 nm. In some embodiments, first optical emitter 14 and second optical emitter 16 can produce the same wavelength of light. In some embodiments, only first optical emitter 14 can be used. In these other embodiments, first optical emitter 14 can be configured to emit multiple wavelengths of light. In yet other embodiments, a third optical emitter (not shown) can be used.

In the illustrated embodiment, first optical emitter 14 and second optical emitter 16 are light emitting diodes (LEDs). In other embodiments, first optical emitter 14 and/or second optical emitter 16 can produce light by any suitable means. For example, in those other embodiments, first optical emitter 14 and/or second optical emitter 16 can be a laser diode. In some embodiments, first optical emitter 14 and second optical emitter 16 can be combined in the same device.

Referring again to FIG. 1, chamberless detector 12 includes first optical detector 18 and second optical detector 20. In the illustrated embodiment, photoelectric indication of light is provided by photo diodes. In other embodiments, first optical detector 18 and/or second optical detector 20 can be any suitable device that produces a photoelectric indication of light. As used in this disclosure, a photoelectric indication of light is a response to a sensing event, whereby a photon or photons of light at a particular wavelength or within a particular wavelength band, excite an optical detector, thereby producing an electrical signal as an output. In other embodiments, only first optical sensor 16 can be used. In other embodiments, more than two detectors (not shown) can be used. In some embodiments, first optical detector 18 and second optical detector 20 can be the same style of photo detector. In other embodiments, first optical detector 18 and second optical detector 20 can be different styles of photo detectors. In some embodiments, first optical detector 18 and second optical detector 20 can be combined in the same device.

In the illustrated embodiment, first optical detector 18 is responsive to a first wavelength of light, and second optical detector 20 is responsive to a second wavelength of light. The first wavelength of light can define a first wavelength band, and the second wavelength can define a second wavelength band. In the illustrated embodiment, the first and second wavelengths are different from each other. In other embodiments, the first and second wavelengths can be the same.

Referring again to FIG. 1, covered point sensor 10 includes protective cover 30. Protective cover 30 defines inside region 28 and outside region 32. In the illustrated embodiment, protective cover 30 has a semi-circular shape as viewed from the side. Protective cover 30 can be referred to as an envelope, defining an inside region and an outside region of protective cover 30. In the illustrated embodiment, protective cover 30 has a diameter of about 10 cm (3.9 inches) in the region near where protective cover 30 attaches to chamberless detector 12. In other embodiments, protective cover 30 can have a diameter between 5-15 cm (2.0-5.9 inches). In yet other embodiments, protective cover 30 can have a diameter of less than 5 cm (2.0 inches), or greater than 15 cm (5.9 inches). In the illustrated embodiment, protective cover 30 has a generally hemispherical shape, in which the height of protective cover 30 is approximately half the diameter. In other embodiments, the geometry of protective cover 30 can be substantially different from hemispherical. For example, in an embodiment, protective cover 30 can be squat in its geometry, with a height less than approximately half the diameter. In another embodiment, the height of protective cover 30 can be significantly less than approximately half the diameter. Alternatively, in yet other embodiments, protective cover 30 can have a bulbous geometry, in which the height of protective cover 30 is greater than approximately half the diameter. In other embodiments, the cover can be cylindrical, square, or rectangular in shape, with these being non-limiting examples of possible geometries of protective cover 30. It will be appreciated that covered point sensor 10 can provide additional benefits including but not limited to reduction of transport time for particles to reach the particle detecting elements to enable faster alerting, alarm, and response by users and systems; improved sensitivity; improved manufacturability; negligible directionality; ease of maintenance; and enhanced aesthetic appearance.

In the illustrated embodiment, protective cover 30 is a continuous surface and covered point sensor 10 includes apertures (not shown) which can allow fluid communication between inside region 28 and outside region 32. As will be discussed later, covered point sensor can detect airborne particulates that are within inside region 28, outside region 32, or both. Generally, airborne particulates are generated or introduced in the environment exterior to covered point sensor 10. Therefore, airborne particulates first occur in outside region 32. Accordingly, fluid communication between inside region 28 an outside region 32 can allow airborne particulates to migrate from outside region 32 to inside region 28. In other embodiments, covered point sensor 10 can include vents, ports, or other mechanisms that permit fluid communication between inside region 28 and outside region 32. As used in this disclosure, protective cover 30 is assumed to be a continuous surface which possesses optical properties thereof. Any reference to the transmission of light through protective cover 30 therefore refers to the transmission of light through the material from which protective cover 30 is made.

As noted earlier, in the embodiment depicted in FIG. 1, only second emitter cone 36 is shown for ease of illustration but it is to be appreciated that first optical emitter 14 also has an associated first emitter cone. Similarly, only first receiving cone 38 is shown for ease of illustration but it is to be appreciated that second optical detector 20 also has an associated second receiving cone. During operation of covered point sensor 10, second optical emitter 16 emits light in second emitter cone 36 having second emitter axis E2. In a particular embodiment, second emitter axis azimuthal angle 42 (not shown) can be measured relative to a datum on chamberless detector 12. Second emitter cone half angle $\theta_{E2}$ refers to the half-angle width of the expanding three-dimensional second emitter cone 36 that is emitted from second optical emitter 16. Second emitter cone half angle $\theta_{E2}$ is measured at the half-intensity point of optical energy being radiated from second optical emitter 16. This can also be referred to as the full width half-maximum (FWHM).

During operation of covered point sensor 10, first optical detector 18 senses light in first receiving cone 38 having first receiving cone axis R1. First receiving cone axis R1 has first receiving cone axis azimuthal angle $\theta_{R1}$ (not shown) and first receiving cone half angle $\theta_{R1}$. In a particular embodiment, first receiving cone axis azimuthal angle 41 can be measured relative to a datum on chamberless detector 12. First receiving cone half angle $\theta_{R1}$ refers to the half angle width of the expanding three-dimensional cone of visibility that is detectible by first optical detector 18. First receiving cone half angle $\theta_{R1}$ is measured at the half-intensity point of optical energy being detected by first optical detector 18. This can also be referred to as FWHM.

In the illustrated embodiment of FIG. 1, protective cover 30 is optically transparent to some or all wavelengths of light that are produced by second optical emitter 16 and received by first optical detector 18. In one embodiment, protective cover 30 is comprised of transparent acrylic. In other embodiments, protective cover 30 can be any material that is transparent or substantially transparent to ambient light such as glass or resin. Accordingly, in the embodiment shown in FIG. 1, second emitting cone 36 is projected through inside region 28 and through protective cover 30 to outside region 32, and first receiving cone 38 extends through inside region 28 and through protective cover 30 to outside region 32. First sensing volume 42 is defined by the spatial overlap of second emitter cone 36 and first receiving cone 38. Accordingly, first sensing volume 42 is defined both within inside region 28 and within outside region 32. As can be seen in FIG. 1, the first sensing volume 42 is dependent on second emitter axis E2, second emitter cone half angle $\theta_{E2}$, first receiving cone axis R1, and first receiving cone half angle $\theta_{R1}$.

Figure 2:
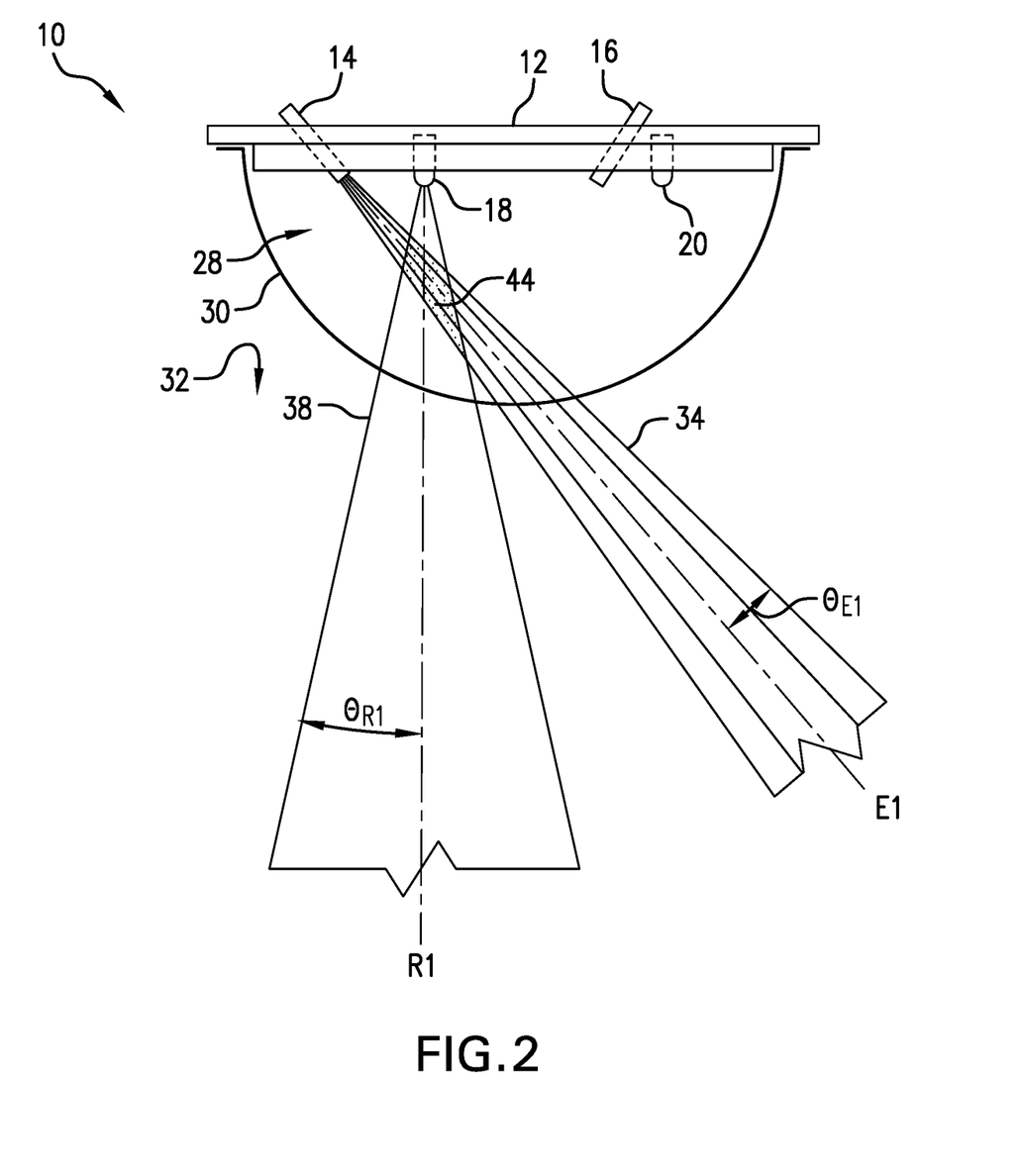
FIG. 2 is a side view of a second mode of the covered point sensor.

FIG. 2 is a side view of a second mode of covered point sensor 10. Shown in FIG. 2 are covered point sensor 10, chamberless detector 12, first optical emitter 14, second optical emitter 16, first optical detector 18, second optical detector 20, inside region 28, protective cover 30, outside region 32, first emitting cone 34, first emitter axis E1, first emitter cone half angle $\theta_{E1}$, first receiving cone 38, first receiving cone axis R1, first receiving cone half angle $\theta_{R1}$, and second sensing volume 44. The description of covered point sensor 10 is similar to as in FIG. 1, with the difference in FIG. 2 being that first emitting cone 34 being radiated from first optical emitter 14 is illustrated, and is defined by first emitter axis E1. First emitter axis E1 has first emitter axis azimuthal angle $\theta_{E1}$ (not shown) and first emitter cone half angle $\theta_{E1}$. In a particular embodiment, first emitter axis E1 has first emitter axis azimuthal angle $\theta_{E1}$ that can be measured relative to a datum on chamberless detector 12. In the illustrated embodiment, protective cover 30 is optically transparent to some or all wavelengths of light that are produced by first optical emitter 14 and received by first optical detector 18. Accordingly, second emitting cone 36 is projected through inside region 28 and through protective cover 30 to outside region 32, and first receiving cone 38 extends through inside region 28 and through protective cover 30 to outside region 32. Second sensing volume 44 is defined by the spatial overlap of first emitter cone 34 and first receiving cone 38. In the illustrated embodiment, second sensing volume 44 is defined entirely within inside region 28. As can be seen in FIG. 2, the definition of second sensing volume 44 is dependent on first emitter axis E1, first emitter cone half angle $\theta_{E1}$, first receiving cone axis R1, and first receiving cone half angle $\theta_{R1}$.

Figure 3:
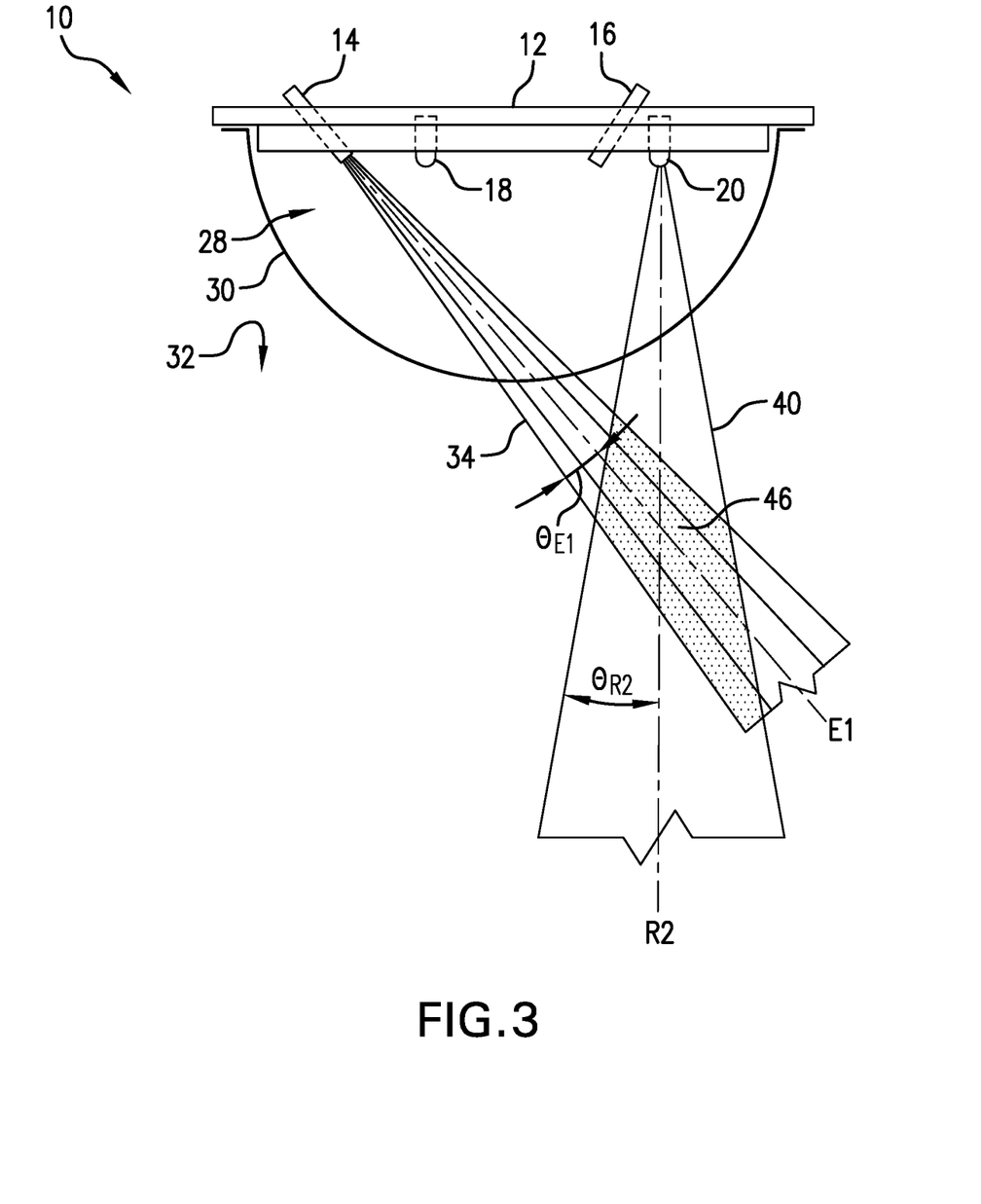
FIG. 3 is a side view of a third mode of the covered point sensor.

FIG. 3 is a side view of a third mode of covered point sensor 10. Shown in FIG. 3 are covered point sensor 10, chamberless detector 12, first optical emitter 14, second optical emitter 16, first optical detector 18, second optical detector 20, inside region 28, protective cover 30, outside region 32, first emitting cone 34, first emitter axis E1, first emitter cone half angle $\theta_{E1}$, second receiving cone 40, second receiving cone axis R2, second receiving cone half angle $\theta_{R2}$, and third sensing volume 46. First emitter axis E1 has first emitter axis azimuthal angle 41 (not shown) and first emitter cone half angle $\theta_{E1}$, as described in FIG. 2. Second receiving cone axis R2 has second receiving cone axis azimuthal angle $\theta_{R2}$ (not shown) and second receiving cone half angle $\theta_{R2}$. In a particular embodiment, second receiving cone axis azimuthal angle 42 can be measured relative to a datum on chamberless detector 12. Second receiving cone half angle $\theta_{R2}$ refers to the half angle width of the expanding three-dimensional cone of visibility that is detectible by second optical detector 20. Second receiving cone half angle $\theta_{R2}$ is measured at the half-intensity point of optical energy being detected by second optical detector 20. This can also be referred to as the FWHM.

The description of covered point sensor 10 is similar to as in FIGS. 1 and 2. In the illustrated embodiment, protective cover 30 is optically transparent to the wavelength of light that is produced by first optical emitter 14 and received by second optical detector 20. Accordingly, first emitting cone 34 is projected through inside region 28 to outside region 32, and second receiving cone 40 extends through inside region 28 to outside region 32. Third sensing volume 46 is defined by the spatial overlap of first emitter cone 34 and second receiving cone 40. In the illustrated embodiment, third sensing volume 46 is defined entirely within outside region 32. As can be seen in FIG. 3, the definition of third sensing volume 46 is dependent on first emitter axis E1, first emitter cone half angle $\theta_{E1}$, second receiving cone axis R2, and second receiving cone half angle $\theta_{R2}$.

Figure 4:
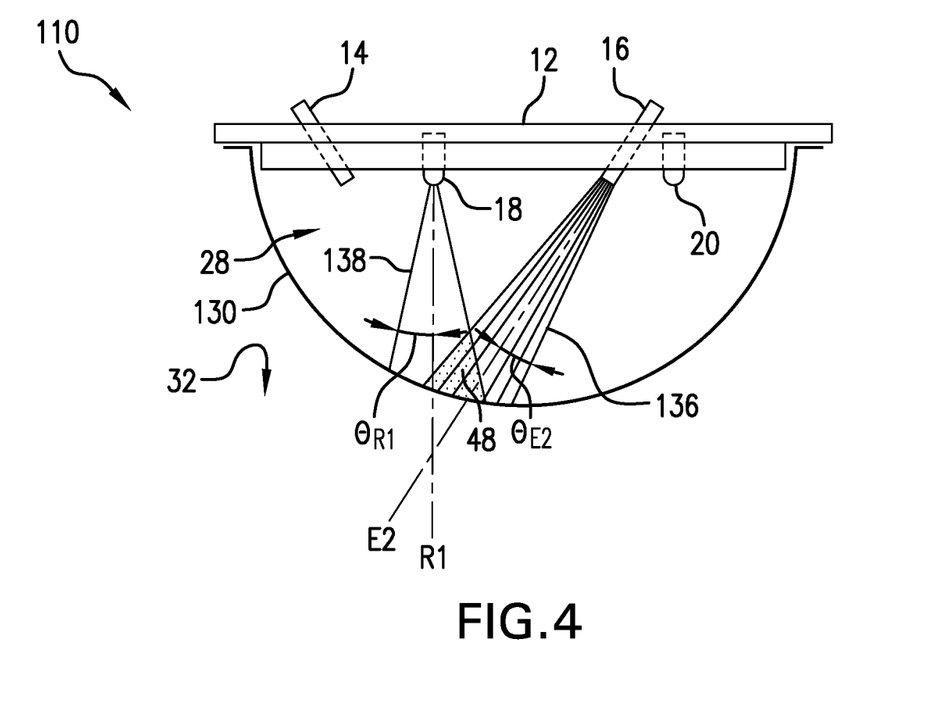
FIG. 4 is a side view of a second embodiment of the covered point sensor.

FIG. 4 is a side view of a second embodiment of covered point sensor 10. Shown in FIG. 4 are covered point sensor 110, chamberless detector 12, first optical emitter 14, second optical emitter 16, first optical detector 18, second optical detector 20, inside region 28, protective cover 130, outside region 32, second emitting cone 136, second emitter axis E2, second emitter cone half angle $\theta_{E2}$, first receiving cone 138, first receiving cone axis R1, first receiving cone half angle $\theta_{R1}$, and fourth sensing volume 48. The description of covered point sensor 110 is similar to as in FIG. 1. In the illustrated embodiment, protective cover 130 is optically absorptive to one or more of the wavelengths of light produced by second optical emitter 16 and received by first optical detector 18. Accordingly, second emitting cone 136 is projected within inside region 28, but does not pass through protective cover 130 to outside region 32. Similarly, first receiving cone 138 is created within inside region 28, but does not extend to outside region 32. In the illustrated embodiment, the protective cover 130 is a homogeneous material that is optically absorptive. In other embodiments, protective cover 130 can be non-homogeneous. In yet other embodiments, protective cover 30 can have an optically absorptive coating.

Fourth sensing volume 48 is defined by the spatial overlap of second emitter cone 136 and first receiving cone 138, and is therefore truncated by protective cover 130. In the illustrated embodiment, truncating fourth sensing volume 48 by protective cover 130 can be beneficial in reducing the occurrences of false alarms that could otherwise occur from fourth sensing volume 48 extending into outside region 32 where external interference may exist. This can improve the operational robustness of covered point sensor 10. As can be seen in FIG. 4, the definition of fourth sensing volume 48 is dependent on second emitter axis E2, second emitter cone half angle $\theta_{E2}$, first receiving cone axis R1, and first receiving cone half angle $\theta_{R1}$. In another embodiment, fourth sensing volume 48 can be made larger than is illustrated in FIG. 4 by the selection of second emitter axis E2, second emitter cone half angle $\theta_{E2}$, first receiving cone axis R1, and/or first receiving cone half angle $\theta_{R1}$ to provide a greater volume of spatial overlap between second emitting cone 136 and first receiving cone 138.

Figure 5:
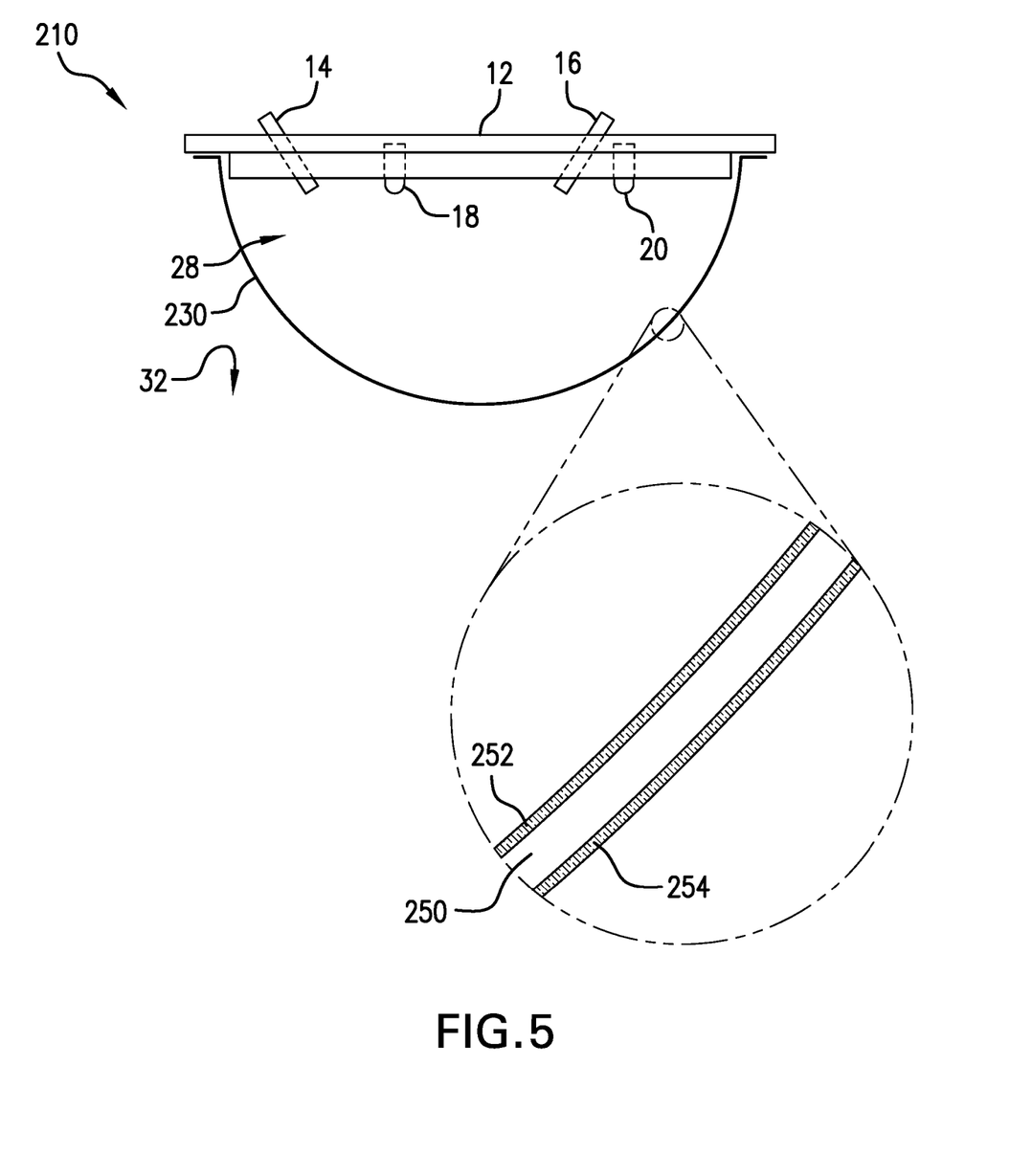
FIG. 5 is a cross sectional side view of an optically enhanced protective cover.

FIG. 5 is a cross sectional side view of protective cover 230. Shown in FIG. 5 are covered point sensor 210, chamberless detector 12, first optical emitter 14, second optical emitter 16, first optical detector 18, second optical detector 20, inside region 28, protective cover 230, outside region 32, cover substrate 250, inside coating 252, and outside coating 254. The description of chamberless detector 12 is similar to that of FIG. 1. Protective cover 230 comprises cover substrate 250, inside coating 252, and outside coating 254. In the illustrated embodiment, cover substrate 250 can be any material that provides form and structure for protective cover 230 including, with non-limiting examples including acrylic, glass, resin, fiberglass, and metal. Inside coating 252 and outside coating 254 is each an optical coating. Inside coating 252 covers the surface of protective cover 230 that faces inside region 28, and outside coating 254 covers the surface of protective cover 230 that faces outside region 32. In some embodiments, inside coating 252 or outside coating 254 can be omitted from protective cover 230. In other embodiments, both inside coating 252 and outside coating 254 can be omitted from protective cover 230. In these other embodiments, cover substrate can be a homogeneous or non-homogeneous material that is optically absorptive at the wavelength or wavelengths of light emitted from first optical emitter 14 and second optical emitter 16. In some embodiments, inside coating 252 and/or outside coating 254 can be reflective at one or more wavelengths of light. In characterizing a material as reflective at a particular wavelength, the reflectivity at a particular wavelength is generally greater than 50%. In other embodiments, inside coating 252 and/or outside coating 254 can be anti-reflective at one or more wavelengths of light. In characterizing a material as anti-reflective at a particular wavelength, the anti-reflectivity at a particular wavelength is generally less than 4%. However, in some embodiments, inside coating 252 and/or outside coating 254 can be characterized as being anti-reflective with an anti-reflectivity that is greater than 4%. Anti-reflective coatings are known to those who are skilled in the optical arts. For example, an anti-reflective coating can be a thin layer of material having an index of refraction that is between the indices of refraction of cover substrate 250 and the air medium surrounding protective cover 230. Moreover, for example, an anti-reflective coating can be a thin layer of material having a thickness that is one-quarter wavelength of the light of concern.

In the embodiment depicted in FIG. 5, inside coating 252 can comprise one or more layers, with each of the one or more layers being configured to provide a specific interaction with incident light. Similarly, outside coating 254 can comprise one or more layers, with each of the one or more layers being configured to provide a specific interaction with incident light. As with cover substrate 250, inside coating 252 and outside coating 254 can each individually or together in any combination provide several specific interactions with incident light including transmission, absorption, and reflection, with each interaction occurring at a particular wavelength or across a particular wavelength band or bands. The transmission, absorption, and/or reflection of light by inside coating 252 and/or outside coating 254 can result from the intrinsic properties of inside coating 252 and/or outside coating 254. In other embodiments, inside coating 252 and/or outside coating 254 can be comprised of diffraction gratings or other polarization materials. In some embodiments, the transmission, absorption, and/or reflection of light protective cover 230 can result from the mismatch between two or more indices of refraction. In the illustrated embodiment, the two or more indices of refraction can exist between inside coating 252, cover substrate 250, outside coating 254, and/or the ambient environment. In some embodiments, the two or more indices of refraction can exist between two or more layers that comprise inside coating 252, and/or between two or more layers that comprise outside coating 254. In other embodiments, the two or more indices of refraction can exist between any combination of inside coating 252, cover substrate 250, and outside coating 254.

It is to be appreciated that in some materials, the index of refraction is dependent on the wavelength of light incident on the material. Accordingly, a particular material can have a different index of refraction for each of the plurality of wavelengths being emitted from first optical emitter 14 and from second optical emitter 16, as well as ambient light in the environment. Moreover, a particular material can have a different index of refraction for each of the plurality of wavelengths being scattered or fluoresced by particulates within first receiving cone 38 and/or second receiving cone 40. Thus, the selection of materials for inside coating 252, cover substrate 250, and outside coating 254 can influence the transmission, absorption, and/or reflection of light by protective cover 230 over various wavelengths.

In some embodiments, inside coating 252 and/or outside coating 254 can be electrically conductive to provide one or more benefits. For example, an electrically conductive inside coating 252 and/or outside coating 254 can provide shielding from electromagnetic interference (EMI). Also, for example, an electrically conductive inside coating 252 and/or outside coating 254 can dissipate a static electricity charge from protective cover 230, thereby minimizing or preventing the static attraction of particulates on protective cover 230.

Referring again to FIG. 5, the optical properties of inside coating 252, cover substrate 250, and/or outside coating 254 can affect light produced from first optical emitter 14 and from second optical emitter 16. Accordingly, the optical properties of inside coating 252, cover substrate 250, and/or outside coating 254 can define the boundaries of first emitting cone 34 and second emitting cone 36. In the illustrated embodiment, the optical properties of inside coating 252, cover substrate 250, and/or outside coating 254 can be wavelength dependent and first optical emitter 14 can have a wavelength that is different from second optical emitter 16. Accordingly, the boundaries of first emitting cone 34 and second emitting cone 36 can be different from each other, depending on the particular wavelengths and optical properties that are used. The optical properties of inside coating 252, cover substrate 250, and/or outside coating 254 can also affect light that is scattered and/or fluoresced from airborne particles (not shown) that can be within inside region 28 and/or outside region 32.

In some embodiments it can be important to prevent or reduce the effect of light sources outside of covered point sensor 10 from interfering with first optical detector 18 and/or second optical detector 20, which could otherwise adversely affect the operation of covered point sensor 10. Sources of light from outside region 32 can include light from first optical emitter 14 and/or second optical emitter 16 that is scattered from particulates in outside region 32, or from ambient light external to covered point sensor 10. Non-limiting examples of ambient light can include light sources in the vicinity of covered point sensor such as office, room, and cargo bay lighting, or from direct or reflected light from other sources such as sunlight. These various sources of ambient light can be broad or narrow bands of light in the range of wavelengths from about 300-3000 nm. Ambient light originating external to covered point sensor 210 can be referred to as ambient light. Accordingly, the optical properties of inside coating 252, cover substrate 250, and/or outside coating 254 can be configured to reduce or eliminate these external sources of light from affecting from first optical emitter 14 and/or second optical emitter 16.

Figure 6:
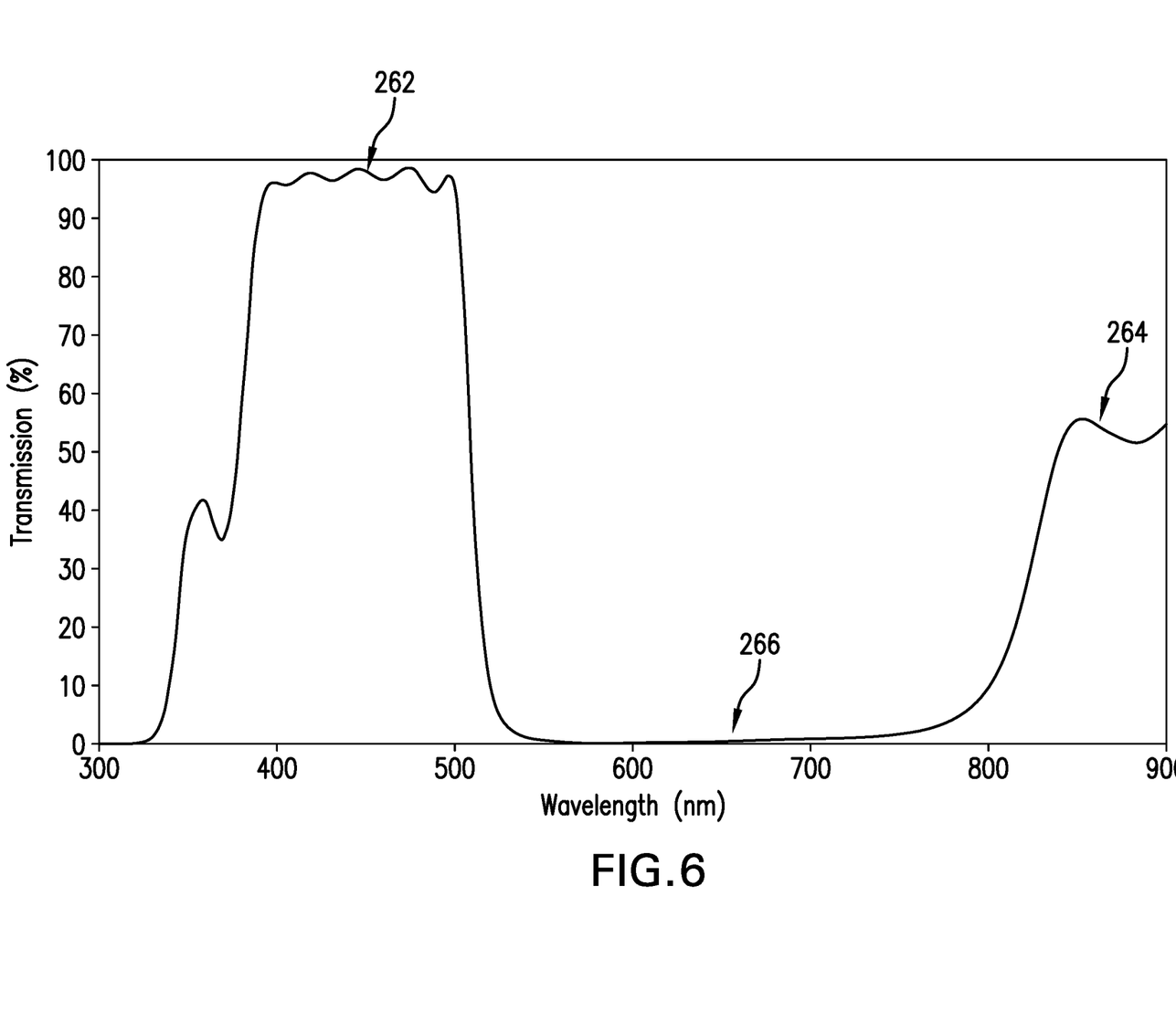
FIG. 6 is a graph of optical transmission vs. wavelength for an embodiment of the optically enhanced protective cover in FIG. 5.

FIG. 6 is a graph of optical transmission vs. wavelength for an embodiment of protective cover 230 shown in FIG. 5, with the axes of the graph being optical transmission (%) vs. wavelength (nm). Shown in FIG. 6 are first peak 262, second peak 264, and valley 266. First peak 262 and second peak 264 are regions of high optical transmission by protective cover 230. Optical transmission can also be referred to as optical transmissivity. In the illustrated embodiment, first peak 262 occurs at a wavelength between approximately 380-510 nm, and second peak 264 occurs at wavelengths above approximately 830-900 nm. These wavelength ranges can be referred to as the bandwidths. In some embodiments, second peak can extend to wavelengths that are greater than 900 nm. First peak 262 and/or second peak 264 can include wavelengths that are associated with first optical emitter 14 and/or second optical emitter 16. Valley 266 includes the wavelengths that lie between first peak 262 and second peak 264. Valley 266 is a region of wavelengths of low optical transmission by protective cover 230, and can include wavelengths of light that are associated with interfering sources of light.

In other embodiments, first peak 262 and/or second peak 264 can occur between different wavelengths of light. Accordingly, in these other embodiments, valley 266 can include a different range of wavelengths of light. In some embodiments, there can be only one transmission peak. In yet other embodiments, there can be more than two transmission peaks. In some embodiments, there can be two or more valleys.

Referring back to FIG. 4, the depicted embodiment disclosed protective cover 130 as being optically absorptive to one or more the wavelengths of light produced by second optical emitter 16 and received by first optical detector 18.

Accordingly, a graph of optical transmission vs. wavelength for the embodiment of protective cover 130 shown in FIG. 4 would be zero, or a relatively small value, at the bandwidths of interest.

Figure 7:
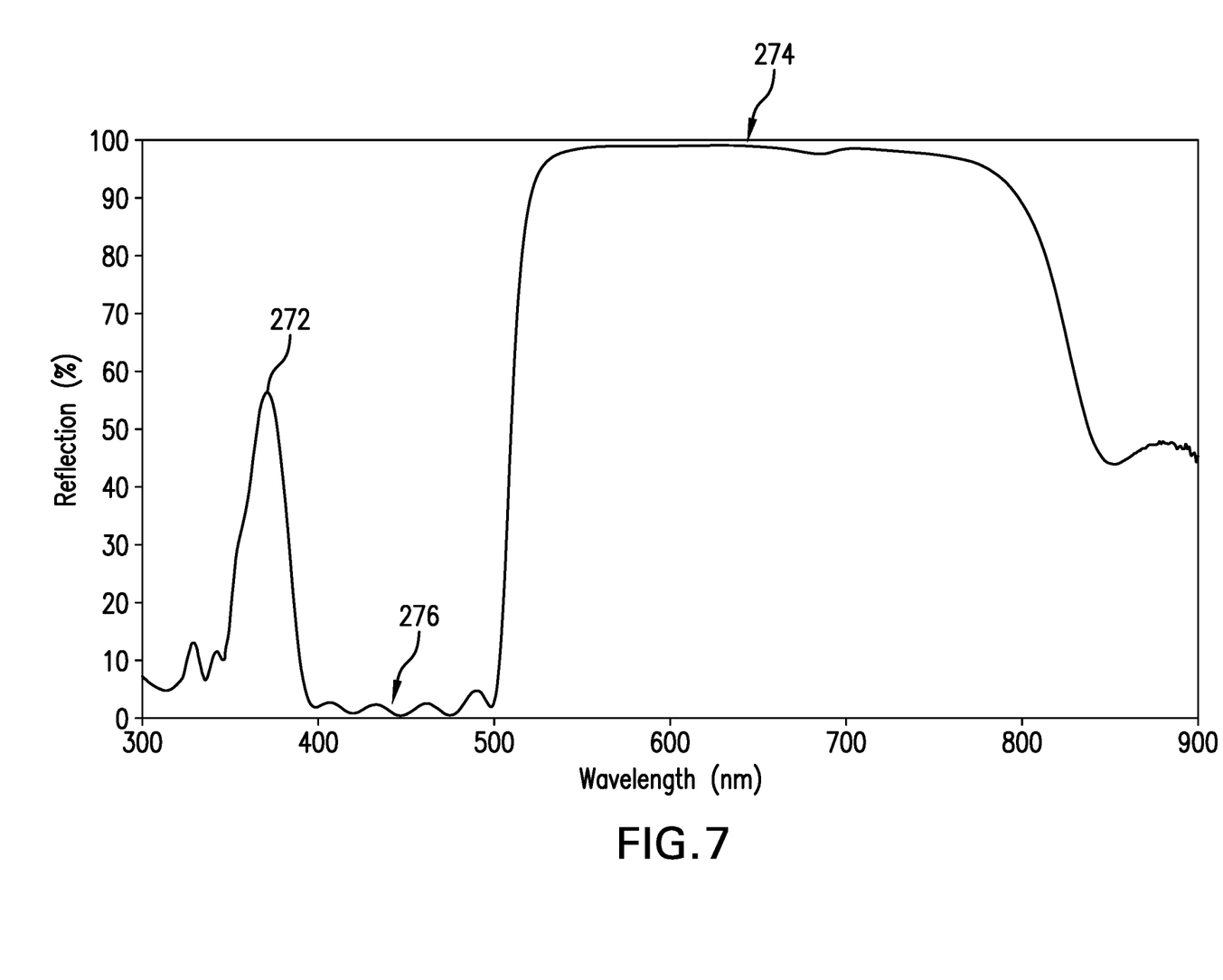
FIG. 7 is a graph of optical reflection vs. wavelength for an embodiment of the optically enhanced protective cover in FIG. 5.

FIG. 7 is a graph of optical reflection vs. wavelength for another embodiment of protective cover 230 shown in FIG. 5, with the axes of the graph being optical reflection (%) vs. wavelength (nm). Shown in FIG. 7 are first peak 272, second peak 274, and valley 276. First peak 272 and second peak 274 are regions of high optical reflection by protective cover 230. Optical reflection can also be referred to as optical reflectivity. In the illustrated embodiment, first peak 272 occurs at a wavelength between approximately 360-376 nm, and second peak 274 occurs at a wavelength between approximately 510-830 nm, as measured at the FWHM. These wavelength ranges can be referred to as the bandwidths. In some embodiments, first peak 272 and/or second peak 274 can include wavelengths that are associated with first optical emitter 14 and/or second optical emitter 16. In other embodiments, first peak 272 and/or second peak 274 can include wavelengths that are associated with interfering sources of light, for which it is desirable they be reflected. Valley 276 includes the wavelengths that lie between first peak 262 and second peak 264. Valley 276 is a region of wavelengths of low optical reflection by protective cover 230, and can include wavelengths of light that are associated with first optical emitter 14 and/or second optical emitter 16. In some embodiments, valley 276 can include wavelengths of light that are associated with interfering sources of light. In some embodiments, it can be desirable to reject interfering wavelengths of light to improve the performance of covered point sensor 210.

In other embodiments, first peak 272 and/or second peak 274 can occur between different wavelengths of light. Accordingly, in these other embodiments, valley 276 can include a different range of wavelengths of light. In some embodiments, there can be only first reflection peak 272. In yet other embodiments, there can be three or more reflection peaks. In some embodiments, there can be two or more valleys.

In the illustrated embodiment, the properties of optical reflection and/or optical anti-reflection for protective cover 230 can be different between inside coating 252 and outside coating 254, thereby affecting light in inside region 28 and outside region 32 differently. Therefore, in specifying optical reflection and/or anti-reflection, a distinction is made between inside coating 252 and outside coating 254. In other embodiments, inside coating 252 and outside coating 254 can have similar optical properties of reflection.

It is to be understood that the optical properties of protective cover 230, as shown in FIG. 5, can be characterized by several different characteristics, including without limitation, transmission, reflection, and absorption. Moreover, the optical properties of inside coating 252 can be different from the optical properties of outside coating 254. Protective cover 230 can have optical properties of absorption (not shown). The optical properties of absorption can be shown graphically on axes of optical absorption (%) vs. wavelength (nm), similar to the optical properties of transmission and reflection as shown in FIGS. 6 and 7, respectively. Therefore, several graphs of various optical properties vs. wavelength can be used to characterize the optical properties of protective cover 230 in various embodiments.

Discussion of Possible Embodiments

The following are non-exclusive descriptions of possible embodiments of the present invention.

A covered chamberless particulate detector comprises a chamberless detector configured to produce a signal when particulate sensing events occur; one or more optical emitters disposed on the chamberless detector, configured to emit one or more emitting cones of light; one or more optical sensors disposed on the chamberless detector, defining one or more receiving cones; and a protective cover defining an inside region and an outside region, the protective cover disposed on the chamberless detector; wherein each of the one or more optical sensors is configured to detect occurrence of particulate sensing events; the protective cover comprises a material, the material having one or more optical properties selected from the group consisting of transmission, reflection, and absorption; and at least one of the one or more optical properties further comprises a bandwidth.

The covered chamberless particulate detector of the preceding paragraph can optionally include, additionally and/or alternatively, any one or more of the following features, configurations and/or additional components:

A further embodiment of the foregoing covered chamberless particulate detector, wherein each of the one or more emitting cones of light is configured to spatially overlap with each of the one or more receiving cones, thereby creating one or more sensing volumes.

A further embodiment of the foregoing covered chamberless particulate detector, further configured to create one or more of the sensing volumes in the inside region.

A further embodiment of the foregoing covered chamberless particulate detector, further configured to create one or more of the sensing volumes in the outside region.

A further embodiment of the foregoing covered chamberless particulate detector, wherein the one or more optical emitters comprises two optical emitters, each configured to emit a different wavelength of light; and the one or more optical sensors comprises two optical detectors, each configured to detect a different wavelength of light.

A further embodiment of the foregoing covered chamberless particulate detector, wherein the protective cover is configured to truncate the one or more sensing volumes.

A further embodiment of the foregoing covered chamberless particulate detector, wherein the protective cover is comprised of a substrate and at least one coating; the substrate has a substrate index of refraction; and the at least one coating has a coating index of refraction.

A further embodiment of the foregoing covered chamberless particulate detector, wherein the protective cover is configured to be anti-reflective at one or more wavelengths of light.

A further embodiment of the foregoing covered chamberless particulate detector, wherein the protective cover is configured to reflect one or more wavelengths of light, each of the one or more wavelengths of light having a bandwidth.

A further embodiment of the foregoing covered chamberless particulate detector, wherein the one or more wavelengths of light correspond to one or more wavelengths of ambient light.

A further embodiment of the foregoing covered chamberless particulate detector, wherein the protective cover is configured to absorb one or more wavelengths of light, each of the one or more wavelengths having a bandwidth.

A further embodiment of the foregoing covered chamberless particulate detector, wherein the one or more wavelengths of light correspond to one or more wavelengths of ambient light.

A further embodiment of the foregoing covered chamberless particulate detector, wherein the one or more wavelengths of light correspond to light emitted by the one or more optical emitters.

A further embodiment of the foregoing covered chamberless particulate detector, wherein the protective cover is configured to transmit one or more wavelengths of light, each of the one or more wavelengths having a bandwidth.

A further embodiment of the foregoing covered chamberless particulate detector, wherein the one or more wavelengths of light correspond to light that is emitted by the one or more optical emitters.

A further embodiment of the foregoing covered chamberless particulate detector, wherein the one or more wavelengths of light correspond to light that is fluoresced by airborne particulates.

A method of using a covered chamberless particulate detector that comprises one or more optical emitters, one or more optical sensors, and an optically enhanced protective cover over the optical emitters and the optical sensors that defines an inside region and an outside region, the method comprising emitting one or more emitting cones of light from the one or more optical emitters; receiving light in one or more receiving cones by the one or more optical sensors; creating one or more sensing volumes within the spatial overlap between the one or more emitting cones and the one or more receiving cones; and detecting particulate sensing events, and producing a signal denoting occurrence of the particulate sensing events, based on presence of particulate material in the one or more sensing volumes; wherein each of the one or more optical sensors is configured to detect occurrence of particulate sensing events; the protective cover comprises a material, the material having one or more optical properties selected from the group consisting of transmission, reflection, and absorption; and at least one of the one or more optical properties further comprises a bandwidth.

The method of the preceding paragraph can optionally include, additionally and/or alternatively, any one or more of the following features, configurations and/or additional components:

A further embodiment of the foregoing method, wherein the protective cover is configured to reflect one or more light wavelengths, each of the one or more wavelengths having a bandwidth.

A further embodiment of the foregoing method, wherein the protective cover is configured to absorb one or more light wavelengths, each of the one or more wavelengths having a bandwidth.

A further embodiment of the foregoing method, wherein the protective cover is configured to transmit one or more light wavelengths, each of the one or more wavelengths having a bandwidth.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A covered chamberless particulate detector comprising:
a chamberless detector having a working side, configured to produce a signal when particulate sensing events occur;
one or more optical emitters disposed on the working side of the chamberless detector, configured to emit one or more emitting cones of light;
one or more optical sensors disposed on the working side of the chamberless detector, defining one or more receiving cones; and
a protective cover defining an inside region and an outside region, the protective cover disposed on the chamberless detector;
wherein:
each of the one or more optical sensors is configured to detect occurrence of particulate sensing events;
the protective cover comprises at least one material configured to reflect or absorb first selected bandwidths of wavelengths of light that include wavelengths of ambient light; and
the protective cover encapsulates substantially all of the working side of the chamberless detector, the optical emitters, and the optical sensors.

2. The covered chamberless particulate detector of claim 1, wherein each of the one or more emitting cones of light is configured to spatially overlap with each of the one or more receiving cones, thereby creating one or more sensing volumes.

3. The covered chamberless particulate detector of claim 2, further configured to create one or more of the sensing volumes in the inside region.

4. The covered chamberless particulate detector of claim 2, further configured to create one or more of the sensing volumes in the outside region.

5. The covered chamberless particulate detector of claim 1, wherein:
the one or more optical emitters comprises two optical emitters, each configured to emit a different wavelength of light; and
the one or more optical sensors comprises two optical detectors, each configured to detect a different wavelength of light.

6. The covered chamberless particulate detector of claim 2, wherein the protective cover is configured to truncate the one or more sensing volumes.

7. The covered chamberless particulate detector of claim 1, wherein:
the protective cover is comprised of a substrate and at least one coating;
the substrate has a substrate index of refraction; and
the at least one coating has a coating index of refraction.

8. The covered chamberless particulate detector of claim 1, wherein the protective cover is configured to be anti-reflective at one or more wavelengths of light.

9. The covered chamberless particulate detector of claim 1, wherein the first selected bandwidths of wavelengths of light correspond to light emitted by the one or more optical emitters.

10. A covered chamberless particulate detector comprising:
a chamberless detector configured to produce a signal when particulate sensing events occur;
one or more optical emitters disposed on the chamberless detector, configured to emit one or more emitting cones of light;

one or more optical sensors disposed on the chamberless detector, defining one or more receiving cones; and a protective cover defining an inside region and an outside region, the protective cover disposed on the chamberless detector;

wherein:

each of the one or more optical sensors is configured to detect occurrence of particulate sensing events; and the protective cover comprises at least one material configured to reflect or absorb first selected bandwidths of wavelengths of light that include wavelengths of ambient light; and the protective cover is configured to transmit second selected bandwidths of wavelengths of light corresponding to light that is emitted by the one or more optical emitters and that is fluoresced by airborne particulates.

11. A method of using a covered chamberless particulate detector having a working side that comprises one or more optical emitters on the working side, one or more optical sensors on the working side, and an optically enhanced protective cover over the optical emitters and the optical sensors that defines an inside region and an outside region, the method comprising:

emitting one or more emitting cones of light from the one or more optical emitters;

receiving light in one or more receiving cones by the one or more optical sensors;

creating one or more sensing volumes within the spatial overlap between the one or more emitting cones and the one or more receiving cones; and detecting particulate sensing events, and producing a signal denoting occurrence of the particulate sensing events, based on presence of particulate material in the one or more sensing volumes;

wherein:

each of the one or more optical sensors is configured to detect occurrence of particulate sensing events;

the protective cover comprises at least one material configured to reflect or absorb first selected bandwidths of wavelengths of light that include wavelengths of ambient light; and the protective cover encapsulates substantially all of the working side of the chamberless detector, the optical emitters, and the optical sensors.

12. The method of claim 11, wherein the protective cover is configured to transmit second selected bandwidths of wavelengths of light corresponding to light that is emitted by the one or more optical emitters and that is fluoresced by airborne particulates.

* * * * *